(12) United States Patent
Demarest

(10) Patent No.: US 7,542,147 B2
(45) Date of Patent: Jun. 2, 2009

(54) DATA AGE COMPENSATION WITH AVALANCHE PHOTODIODE

(75) Inventor: Frank C. Demarest, Higganum, CT (US)

(73) Assignee: Zygo Corporation, Middlefield, CT (US)

( * ) Notice: Subject to any disclaimer, the term of this patent is extended or adjusted under 35 U.S.C. 154(b) by 353 days.

(21) Appl. No.: 11/605,855

(22) Filed: Nov. 29, 2006

(65) Prior Publication Data

US 2007/0127035 A1 Jun. 7, 2007

Related U.S. Application Data

(60) Provisional application No. 60/741,415, filed on Dec. 1, 2005.

(51) Int. Cl.
*G01B 9/02* (2006.01)
*G01D 1/00* (2006.01)
*G06F 15/00* (2006.01)

(52) U.S. Cl. ........................ 356/487; 702/127

(58) Field of Classification Search ......... 356/484–487, 356/498, 500; 702/127
See application file for complete search history.

(56) References Cited

U.S. PATENT DOCUMENTS

| 4,688,940 | A | 8/1987 | Sommargren et al. |
| 5,530,542 | A | 6/1996 | Kalem et al. |
| 5,608,523 | A | 3/1997 | Kalem et al. |
| 5,767,972 | A * | 6/1998 | Demarest ............... 356/498 |
| 6,218,870 | B1 | 4/2001 | Wilson |
| 6,219,144 | B1 | 4/2001 | Hill et al. |
| 6,252,667 | B1 | 6/2001 | Hill et al. ............... 356/487 |
| 6,327,039 | B1 | 12/2001 | De Groot et al. |
| 6,597,459 | B2 | 7/2003 | Demarest |
| 6,652,367 | B1 | 11/2003 | Lin |
| 6,791,693 | B2 | 9/2004 | Hill |
| 6,819,434 | B2 | 11/2004 | Hill |
| 6,847,452 | B2 | 1/2005 | Hill |
| 6,917,432 | B2 | 7/2005 | Hill |
| 6,975,406 | B2 * | 12/2005 | Demarest ............... 356/500 |
| 6,987,569 | B2 | 1/2006 | Hill |
| 7,382,468 | B2 * | 6/2008 | Kataoka ............... 356/498 |
| 2003/0043384 | A1 | 3/2003 | Hill |
| 2003/0047752 | A1 | 3/2003 | Campbell et al. ......... 257/186 |
| 2003/0053073 | A1 | 3/2003 | Hill |
| 2003/0117631 | A1 | 6/2003 | Hill |
| 2003/0169429 | A1 | 9/2003 | Hill |
| 2003/0218757 | A1 | 11/2003 | Hill |

OTHER PUBLICATIONS

"Recent advances in displacement measuring interferometry" N. Bobroff, Measurement Science & Technology, pp. 907-926, vol. 4, No. 9, Sep. 1993.
"ZM4100 Series Measurement Board Operating Manual" Zygo Corporation, 2005.

* cited by examiner

*Primary Examiner*—Michael A Lyons
(74) *Attorney, Agent, or Firm*—Fish & Richardson P.C.

(57) ABSTRACT

A method is disclosed including conditioning a measurement signal from an interferometer, said conditioning characterized by one or more conditioning parameters; measuring a plurality of values for the conditioned measurement signal; providing one or more values indicative of the conditioning parameters; determining an adjustment value at each measured value of the conditioned measurement signal based on the one or more of the measured values indicative of the conditioning parameters; and adjusting a measured value of the measurement signal according to the adjustment value.

42 Claims, 11 Drawing Sheets

Average Group Delay vs APD Bias (4 MHz – 36 MHz Measurement Signal Frequency)

Phase vs APD Bias (20 MHz)

DATA AGE COMPENSATION WITH AVALANCHE PHOTODIODE

CROSS-REFERENCE TO RELATED APPLICATIONS

This application claims priority to Provisional Patent Application No. 60/741,415 entitled "DATA AGE COMPENSATION WITH AVALANCHE PHOTODIODE," filed on Dec. 1, 2005, the entire contents of which are hereby incorporated by reference.

BACKGROUND

The present disclosure relates generally to methods and apparatuses for measuring changes in length or position; more particularly it relates to reducing the data age differences or position uncertainty between the multiple measurements of length or position.

The use of interferometry to measure changes in position, length, distance or optical length is well known, see for example "Recent advances in displacement measuring interferometry" N. Bobroff, Measurement Science & Technology, pp. 907-926, Vol. 4, No. 9, September, 1993 and U.S. Pat. No. 4,688,940 issued Aug. 25, 1987. A typical displacement measuring interferometer system consists of a frequency-stabilized light source, interferometer optics and measuring electronics. The interferometer optics split the laser light into a reference path and a measurement path, then recombine the light returning from the two paths and direct the recombined light to a photodiode where it produces an interference signal. A distance change of one wavelength in the measurement path relative to the reference path produces a phase change of 360 degrees in the interference signal. The measuring electronics measure and accumulate the change in phase and provide a position output for the application.

In many applications, heterodyne interferometry, in which the measurement and reference beams differ in frequency, is preferred. The different frequencies can be produced, for example, by laser Zeeman splitting, by acousto-optic modulation, or internal to the laser using birefringent elements or the like. The measurement and reference beams may be orthogonally polarized, allowing a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer. The polarizer mixes polarizations of the exit measurement and reference beams to form a mixed beam. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where v is the relative speed of the measurement and reference objects, $\lambda$ is the wavelength of the measurement and reference beams, n is the refractive index of the medium through which the light beams travel, e.g., air or vacuum, and p is the number of passes to the reference and measurement objects. Changes in the relative position of the measurement object correspond to changes in the phase of the measured interference signal, with a $2\pi$ phase change corresponding to a distance change L of $\lambda/(np)$, where L is a round-trip distance change, e.g., the change in distance to and from a stage that includes the measurement object.

Heterodyne interferometers may also be of the dispersion type. In dispersion measuring applications, optical path length measurements are made at multiple wavelengths, e.g., 532 nm and 1064 nm, and are used to measure the dispersion of a gas in the measurement path of a distance measuring interferometer. The dispersion measurement can be used to convert the optical path length measured by a distance measuring interferometer into a physical length. Such a conversion can be important since changes in the measured optical path length can be caused by gas turbulence and/or by a change in the average density of the gas in the measurement arm even though the physical distance to the measurement object is unchanged. In addition to the extrinsic dispersion measurement, the conversion of the optical path length to a physical length requires knowledge of an intrinsic value of the gas. The factor $\Gamma$ is a suitable intrinsic value and is the reciprocal dispersive power of the gas for the wavelengths used in dispersion interferometry. The factor $\Gamma$ can be measured separately or taken from published literature values.

Many interferometer applications, such as step-and-scan photolithography tools used to manufacture integrated circuits, require measuring multiple axes of motion at high velocity and with high resolution. An advanced photolithography system may include measurement of, for example, eight or more axes. The accuracy requirements increase as the size of the features on the measured object decrease. Rapidly increasing accuracy demands and needs for determining the precise timing of multiple dynamic interferometric position measurements at higher accuracy have fueled numerous efforts to reduce and minimize the various sources of uncertainty that are inherent in currently known methods and apparatus.

To achieve full accuracy with dynamic multi-axis measurements, all measurements should have the same data age, such that simultaneous measurement of each axis represents the same instant in time. Data age is defined as the time from when a change in interferometric position occurs to when the data representing the measured position is output. In a multi-axis dynamic system, when the system relies on position values from several different axes in motion, small differences in data age between axes can result in significant measurement errors. Similarly, small shifts in the phase of the measurement signal can result in significant measurement errors.

Two forms of inherent uncertainty are called fixed delay and variable delay. Fixed delay arises from differences in cable lengths, optical path lengths, photoelectric detector delay, and phase meter offsets in interferometry systems, whereas circuit delay, i.e., group delay, (which varies with signal frequency) gives rise to variable delay. The effects of these delays create differences in the data age of the interferometrically measured values, i.e., the elapsed time between the event representing the position measurement, and when the position data is available to the user. Compensating the data age by adjusting one or more of the delays is generally impractical.

SUMMARY

Interferometric distance measuring, such as angle measurements, requires measuring two or more axes in order to provide the necessary information. An increased number of measurement axes typically requires a more powerful light source, more numerous light sources, or more sensitive measurement electronics. Due to cost, space, and heat dissipation tradeoffs, a preferred solution in many cases is more sensitive measurement electronics to condition the measurement signal.

However, the inventor has recognized that the use of sensitive measurement electronics can give rise to complications which preclude accurate measurements. This is the case when an avalanche photodiode (APD) is used to detect and condition an interferometric measurement signal. An APD may be used to condition a measurement signal by providing a signal gain that depends on an applied bias voltage. This signal gain can improve the signal to noise ratio in a system that would otherwise be limited by, e.g., preamplifier (preamp) noise. An appropriate amount of gain can be varied as necessary by varying the bias voltage. In a multi-axis system, the bias voltage may vary both from axis to axis and with time.

Varying the APD bias voltage also typically results in a varied APD capacitance. A bias dependant change in capacitance results in both a bias dependent phase shift and a bias dependent group delay. Furthermore, the response rate of the APD itself may be bias dependent, introducing an additional bias dependant phase shift. In general, these group delays and phase shifts may vary both from axis to axis and with time, leading to unacceptable measurement error.

U.S. Pat. No. 6,597,459 B2 entitled "DATA AGE ADJUSTMENTS" by Frank C. Demarest (hereby incorporated, in its entirety, by reference) describes a method and apparatus used to compensate data age in measurement signals from an interferometer. In one aspect, this invention features improvements of the method and apparatus which allow for the use of an APD to condition (e.g., amplify) a measurement signal by compensating for measurement errors introduced by the conditioning.

We now summarize different aspects and features of the invention.

In general, in one aspect, a method is disclosed including conditioning a measurement signal from an interferometer, said conditioning characterized by one or more conditioning parameters; measuring a plurality of values for the conditioned measurement signal; providing one or more values indicative of the conditioning parameters; determining an adjustment value at each measured value of the conditioned measurement signal based on the one or more of the measured values indicative of the conditioning parameters; and adjusting a measured value of the measurement signal according to the adjustment value.

The method may include one or more of the following features.

The adjustment value may be determined so as to compensate for a measurement error resulting from the conditioning.

In various embodiments the measurement error may include data age, group delay, phase shift, or detector delay.

In some embodiments, the conditioning of the measurement signal includes a variable amplification of the signal, wherein the amplification depends on the conditioning parameter.

In some embodiments, the variable amplification may be provided by an avalanche photo diode.

In some embodiments, the measurement error may include error introduced by the amplification.

In some embodiments, the adjustment value is determined from one or more look up tables.

In some embodiments, the adjustment value is determined from one or more mathematical formulae.

In some embodiments, the adjustment value is determined from one or more mathematical formulae and one or more look up tables.

In another aspect, an apparatus is disclosed that includes a receiver unit configured to detect an optical measurement signal from an interferometer, convert the optical measurement signal into an electrical measurement signal, and condition the electrical measurement signal based on one or more conditioning parameters. The apparatus further includes an electronic processing unit coupled to the receiver unit, the electronic processing unit configured to: (i) measure a plurality of values for the conditioned signal, (ii) receive one or more values indicative of the conditioning parameters; (iii) determine an adjustment value at each measured value of the conditioned signal based on the one or more of the measured values indicative of the conditioning parameters; and (iv) adjust a measured value of the measurement signal according to the adjustment value.

The apparatus may include one or more of the following features.

The electronic processing unit may include a data age adjuster.

The electronic processing unit may further include a dynamic data age unit.

The adjustment value may be determined so as to compensate for a measurement error resulting from the conditioning.

The receiver unit may include an avalanche photodiode.

The conditioning parameters may include a bias voltage applied to the avalanche photodiode. One or more electrical characteristics of the avalanche photo diode may depend on the bias voltage. For example, in some embodiments, the capacitance of the avalanche photodiode depends on the bias voltage. In some embodiments, bias dependent changes in the electrical characteristics of the avalanche photodiode introduce a bias dependent measurement error.

The receiver unit may further include an amplification circuit. One or more electrical characteristics of the amplification circuit may depend on the bias voltage. In some embodiments, bias dependent changes in the electrical characteristics of the amplification circuit introduce a bias dependent measurement error.

In another aspect, the invention features an interferometer system apparatus including an interferometer configured to produce one or more optical measurement signals, where each measurement signal corresponds to a difference in the optical path lengths of a reference beam and a measurement beam; and the apparatus described above.

The interferometer may be of the heterodyne type.

In various embodiments the measurement signals may characterize the position of one or more measurement objects, one or more angular displacements, or an optical property of one or more measurement objects. In an embodiment the optical properties may include dispersion.

In another aspect, the invention features a lithography system for use in fabricating integrated circuits on a wafer, the system including: a stage for supporting the wafer; an illumination system for imaging spatially patterned radiation onto the wafer; a positioning system for adjusting the position of the stage relative to the imaged radiation; and the interferometer system described above wherein the interferometer is configured to monitor the position of the wafer relative to the imaged radiation.

In another aspect, the invention features a lithography system for use in fabricating integrated circuits on a wafer, the system including: a stage for supporting the wafer; and an illumination system including a radiation source, a mask, a positioning system, a lens assembly, and the interferometer system described above. During operation the source directs radiation through the mask to produce spatially patterned radiation, the positioning system adjusts the position of the mask relative to the radiation from the source, the lens assembly images the spatially patterned radiation onto the wafer, and the interferometer monitors the position of the mask relative to the radiation from the source.

In another aspect, the invention features a beam writing system for use in fabricating a lithography mask, the system including: a source providing a write beam to pattern a substrate; a stage supporting the substrate; a beam directing assembly for delivering the write beam to the substrate; a positioning system for positioning the stage and beam directing assembly relative to one another; and the interferometer system described above, wherein the interferometer system is configured to monitor the position of the stage relative to the beam directing assembly.

In another aspect, the invention features a lithography method for use in fabricating integrated circuits on a wafer, the method including: supporting the wafer on a movable stage; imaging spatially patterned radiation onto the wafer; adjusting the position of the stage; and monitoring the position of the stage using the interferometer system described above.

In another aspect, the invention features a lithography method for use in the fabrication of integrated circuits including: directing input radiation through a mask to produce spatially patterned radiation; positioning the mask relative to the input radiation; monitoring the position of the mask relative to the input radiation using the interferometer system described above; and imaging the spatially patterned radiation onto a wafer.

In another aspect, the invention features a lithography method for fabricating integrated circuits on a wafer, including: positioning a first component of a lithography system relative to a second component of a lithography system to expose the wafer to spatially patterned radiation; and monitoring the position of the first component relative to the second component using the interferometer system described above.

Additionally, the invention features several methods for fabricating integrated circuits, each method including one of the various the lithography methods described above.

In one aspect, the invention features method for fabricating a lithography mask, the method including: directing a write beam to a substrate to pattern the substrate; positioning the substrate relative to the write beam; and monitoring the position of the substrate relative to the write beam using the interferometer system described above Unless otherwise defined, all technical and scientific terms used herein have the same meaning as commonly understood by one of ordinary skill in the art to which this invention belongs. In case of conflict with definitions in documents incorporated by reference, the present document controls.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
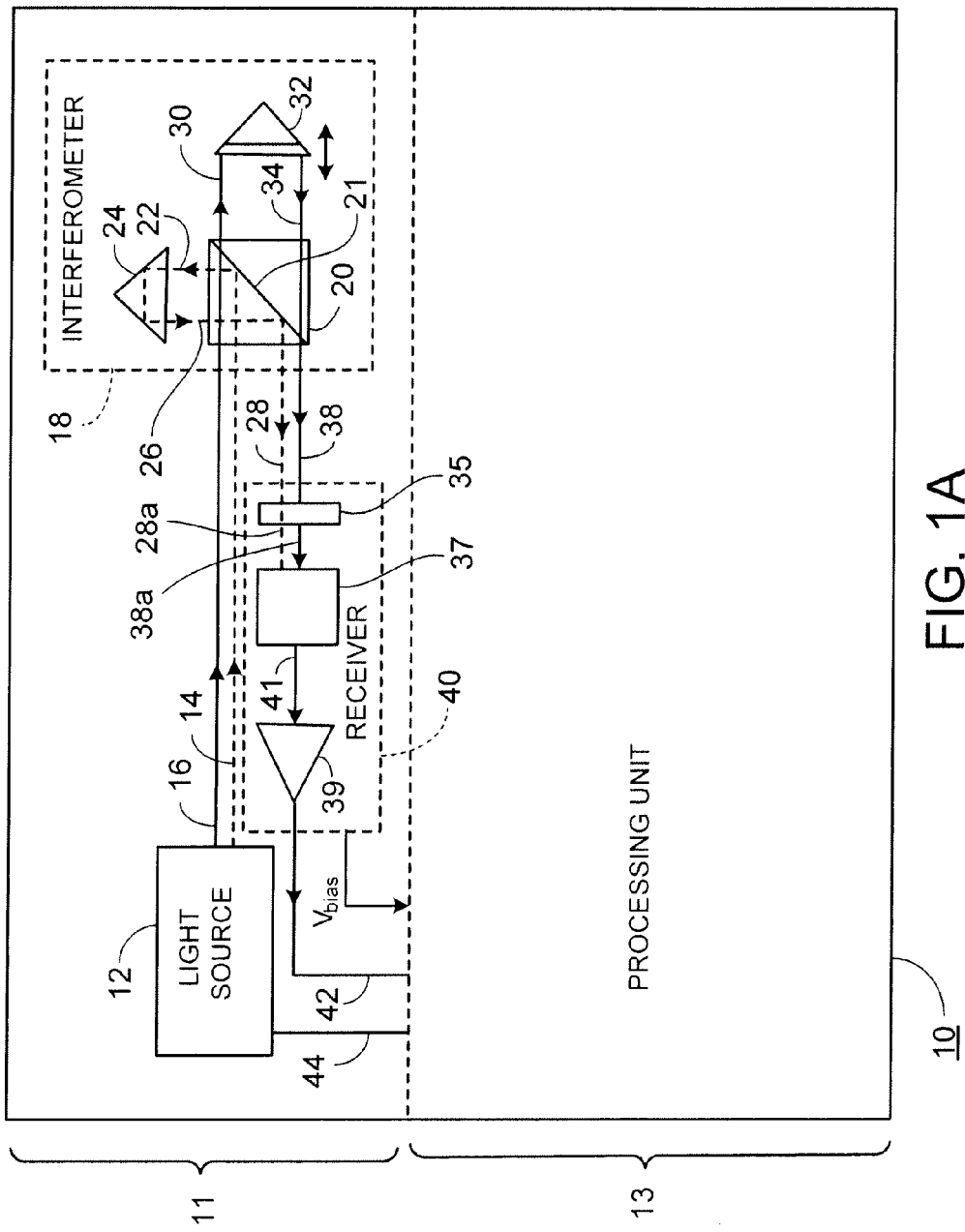
FIG. 1A is a block diagram of an embodiment of an interferometer system.
Figure 1B:
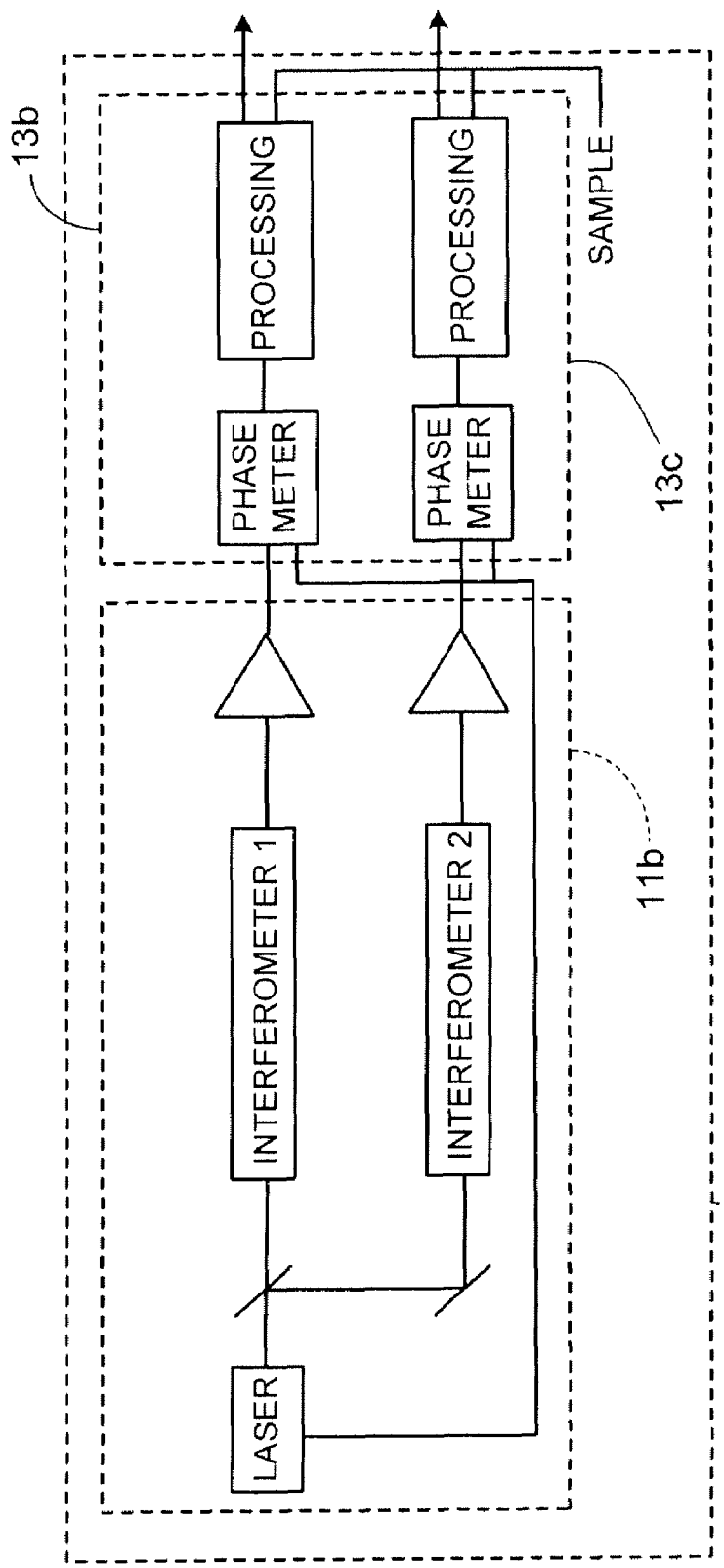
FIG. 1B is another block diagram of an embodiment of an interferometer system.

Referring to FIG. 1A, a heterodyne interferometer system 10 includes an optical measuring unit 11 and an electronic processing unit 13. Heterodyne interferometer system 10 measures changes in the optical path of a single measurement axis and reduces the data age uncertainty of the measured signal. For simplicity, only one measurement axis is shown in heterodyne interferometer system 10. In a multi-axis measurement system, such as shown in FIG. 1B, a heterodyne interferometer system 10b includes an optical measuring unit 11b to probe changes in the optical path of several axes and to produce a conditioned measurement signal for each axis. Electronic processing units 13b and 13c process the conditioned measurement signal from each axis and compensate for measurement error, including error resulting from the conditioning of interferometric measurement signal.

Referring back to FIG. 1A, optical measuring unit 11 includes a light source 12 to generate optical radiation, an interferometer 18 to modulate the optical radiation, and a receiver 40 to receive and convert the modulated optical radiation from interferometer 18 into an electrical measurement signal having a frequency, $F_M$. The receiver unit 40 further conditions the electrical measurement signal based on a conditioning parameter $V_{bias}$.

Electrical processing unit 13 includes analog-to-digital converter (digitizer) 510, phase-locked-loop unit (PLL) 520, phase meter 530, dynamic data age adjuster 540, position calculator 550, velocity estimator 590, digital filter 560, and dynamic data age unit 700. As described in more detail below, electronic processing unit 13 receives the signal from receiver 40 and adjusts the phase of the measurement signal in order to compensate for measurement error, including error resulting from the conditioning of interferometric measurement signal.

Returning to optical measuring unit 11, light source 12, which is typically a frequency stabilized laser, generates a pair of substantially equal intensity, orthogonally polarized, optical beams 14 and 16 that differ in frequency from each other by $f_O$. Optical beams 14 and 16 are also substantially collinear although they are shown in FIG. 1A, merely for clarity and convenience of illustration, as being slightly transversely displaced from each other. Examples of light source 12 can be found, for example, in U.S. Pat. No. 5,249,030 having a difference frequency, $f_O$, of about 20 megahertz (MHz). Of course, in various embodiments, the difference frequency, $f_O$, can be lower or higher than 20 MHz. Interferometer 18 modulates optical beam 16 relative to optical beam 14 based on changes in length of the measurement path or position of the measurement object. Interferometer 18, although shown in FIG. 1A as a linear displacement interferometer, can have any number of designs. For example, any interferometer which produces a measurement signal sensitive to changes in the optical path length of optical beam 16 relative optical beam 14 is sufficient, whether the changes result from linear displacement, angular displacement, dispersion, or other effects. Polarization beamsplitter 20 is oriented relative to optical beams 14 and 16 to reflect optical beam 14 as beam 22 to a first retroreflector 24 and transmit optical beam 16 as beam 30 to a second retroreflector 32. Retroreflector 24 reflects beam 22 back to the beamsplitter 20 as beam 26 and retroreflector 32 reflects beam 30 back to beamsplitter 20 as beam 34. Beam 34 passes through beamsplitter 20 as output beam 38, whereas beam 26 is reflected by beamsplitter 20 as an output beam 28. Output beams 28 and 38 are, as the incoming beams 14 and 16, substantially collinear and orthogonally polarized. Retroreflector 24 is fixed relative to beamsplitter 20 so as to define a fixed length path traversed by beams 22 and 26 through interferometer 18. Second retroreflector 32 is movable or displaceable relative to beamsplitter 20 and in the directions indicated by the arrows in FIG. 1A to define a variable length path of optical beams 30 and 34. Movement or displacement of retroreflector 32 varies the phase of the output beam 38 relative to output beam 28.

Output beams 28 and 38 are directed through a receiver 40 including a mixing polarizer 35 to provide each output beam 28 and 38 with components of the same polarization. The resulting similarly polarized beams 28a and 38a are applied to an avalanche photodiode (APD) detector 37, to produce an electrical measurement or interference signal 41

Interference signal 41 from APD 37 further passes through a signal amplification and conditioning circuit 39 which includes a pre amp stage, a low pass filter, and a post amp stage to produce a conditioned measurement signal 42. The frequency of measurement signal 42 is $$F_M = f_O \pm nv/\lambda,\quad(1)$$

where $\pm nv/\lambda$ is the Doppler shift frequency, v is the velocity of the interferometer element whose position is being measured, $\lambda$ is the wavelength of light and n is 2. The value of n depends on the number of passes the light makes through the interferometer.

APD 37 conditions the measurement signal by providing a signal gain that depends on an applied bias voltage, $V_{bias}$. This signal gain can improve the signal to noise ratio in a system that would otherwise be limited by preamp noise. An increase in $V_{bias}$ results in an increased gain. However, in various embodiments, an increase in $V_{bias}$ also results in a reduced APD capacitance. The reduction in capacitance with increased $V_{bias}$ causes an increase in preamp bandwidth, resulting in both a bias dependent phase shift and a bias dependent group delay. Furthermore, the response rate of the APD itself may be bias dependent, introducing an additional bias dependant phase shift. In general, for simplicity, the APD response time may be considered together with the preamp phase shift.

Figure 2A:
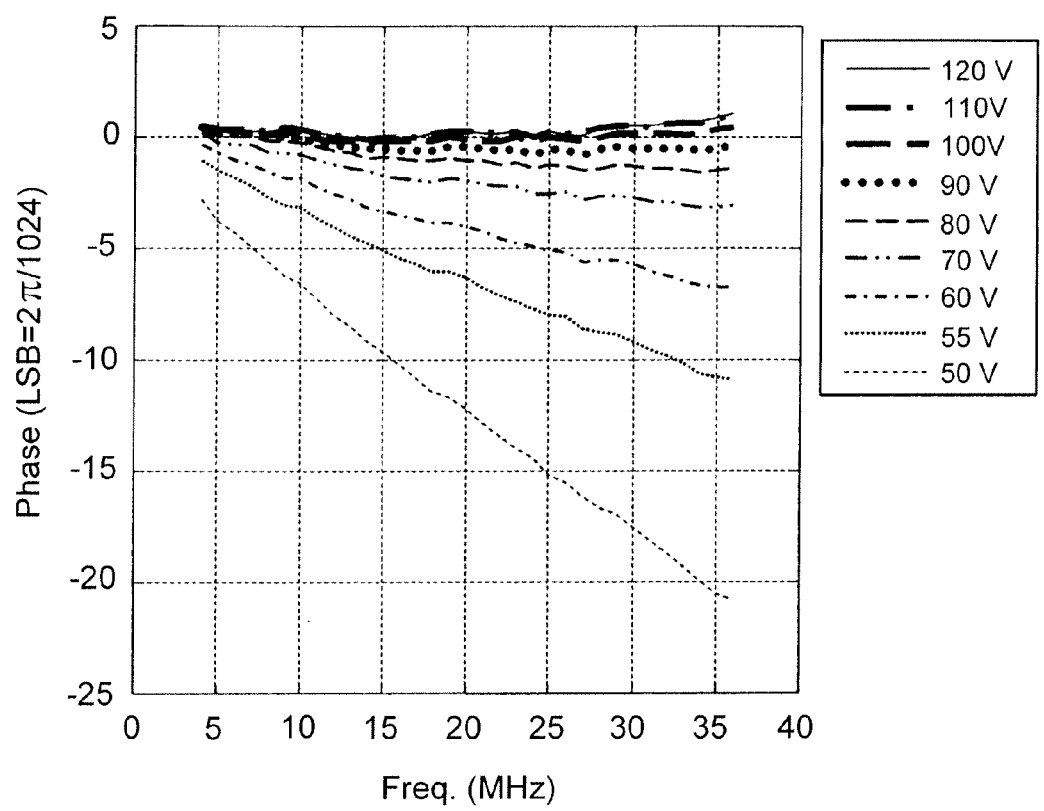
FIG. 2A is a plot of phase vs. frequency characteristics for several avalanche photodiode bias voltages.
Figure 2B:
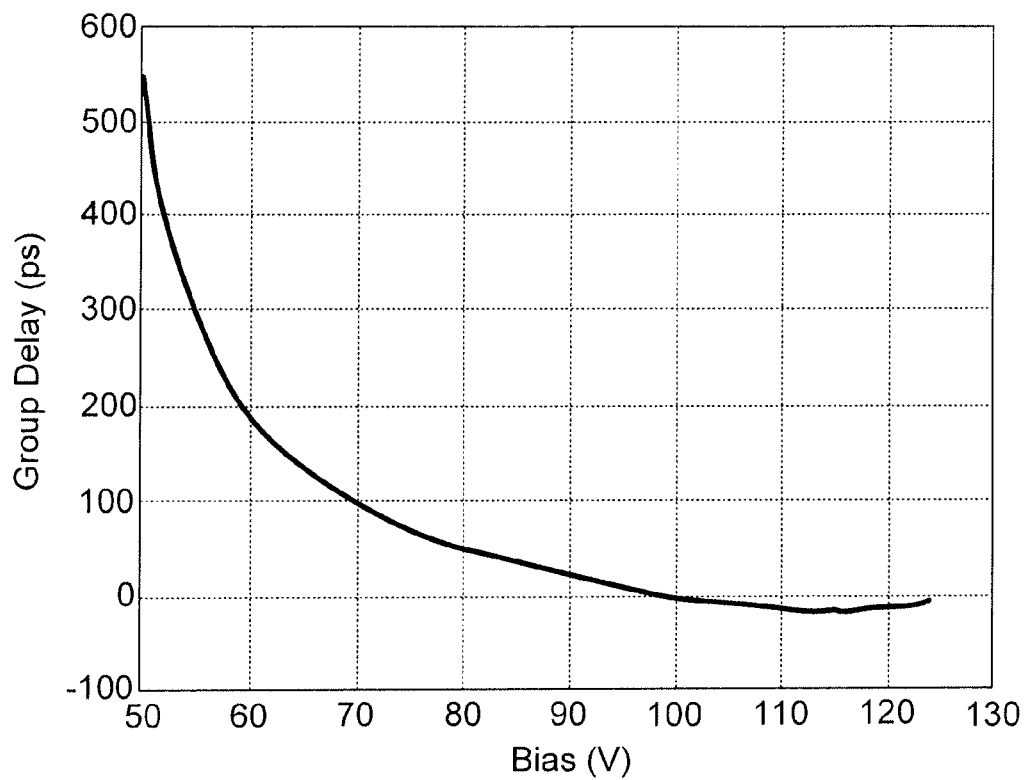
FIG. 2B is a plot of average group delay vs. bias voltage.
Figure 2C:
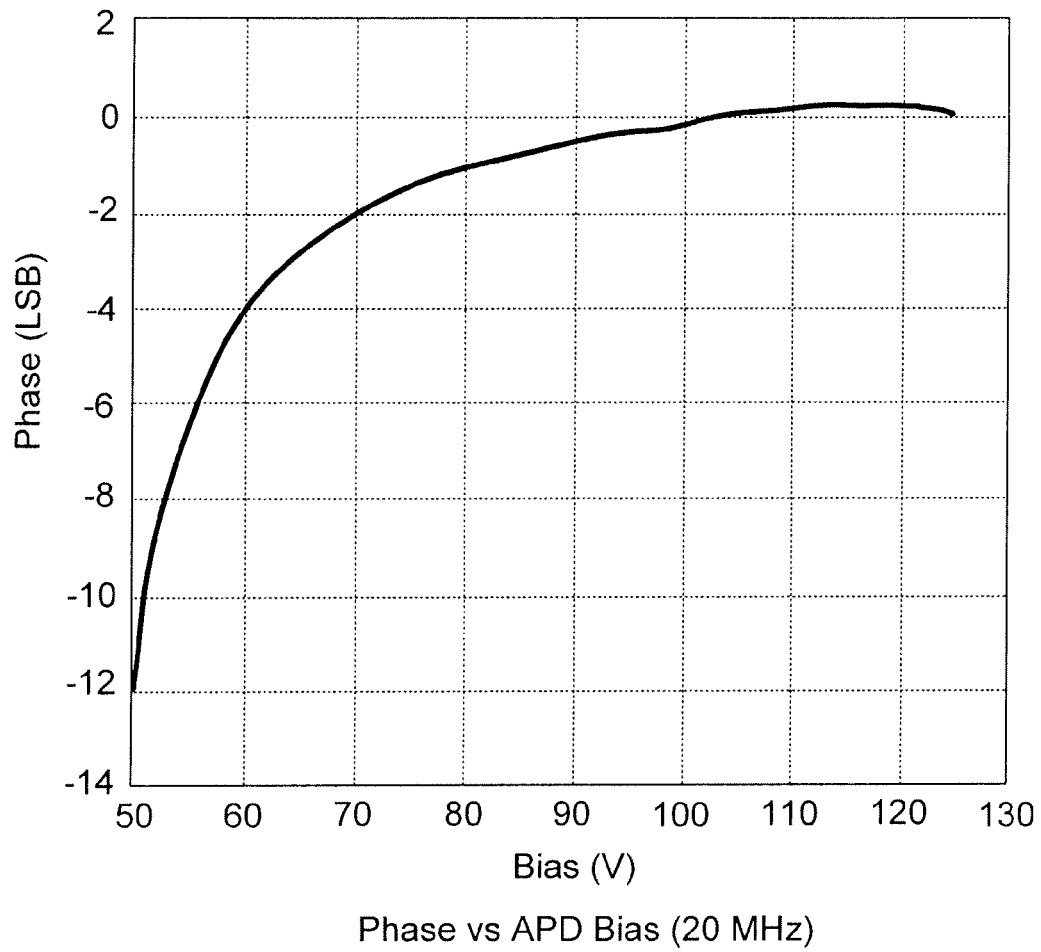
FIG. 2C is a plot of phase vs. bias voltage.

FIG. 2A shows the phase vs. frequency characteristics of a typical APD and preamp circuit for several bias voltages (intermediate voltages are omitted for clarity). Group delay, or data age, of a signal path is calculated as the negative derivative of phase with respect to frequency. FIG. 2B shows the dependence of measurement signal average group delay on $V_{bias}$. For each value of $V_{bias}$, the average group delay is taken over a range of measurement signal frequencies (4 MHz to 36 MHz). FIG. 2C shows the dependence of the measurement signal phase on $V_{bias}$ for a 20 MHz measurement signal. Additionally, the low pass filter and post amp stage may introduce phase shifts which depend of the frequency of the measurement signal. These bias and frequency dependant effects introduce measurement errors which must be compensated for, as will be discussed further below.

Returning to FIG. 1A and FIG. 3, a light source 12 also sends reference signal 44 having a frequency, $F_R$, via a fiber-optic cable to fiber-optic receiver 41, similar to receiver 40, in electronic processing unit 13. Although receiver 40 is shown in optical measuring unit 11 and fiber-optic receiver 41 is shown in electronic processing unit 13, several permutations of receivers and fiber-optic cables are possible. For instance, electronic processing unit 13 may include two fiber-optic receivers, one for receiving reference signal 44 and another for receiving output beams 28a and 38a sent through a fiber-optic cable from optical measuring unit 11.

Figure 3:
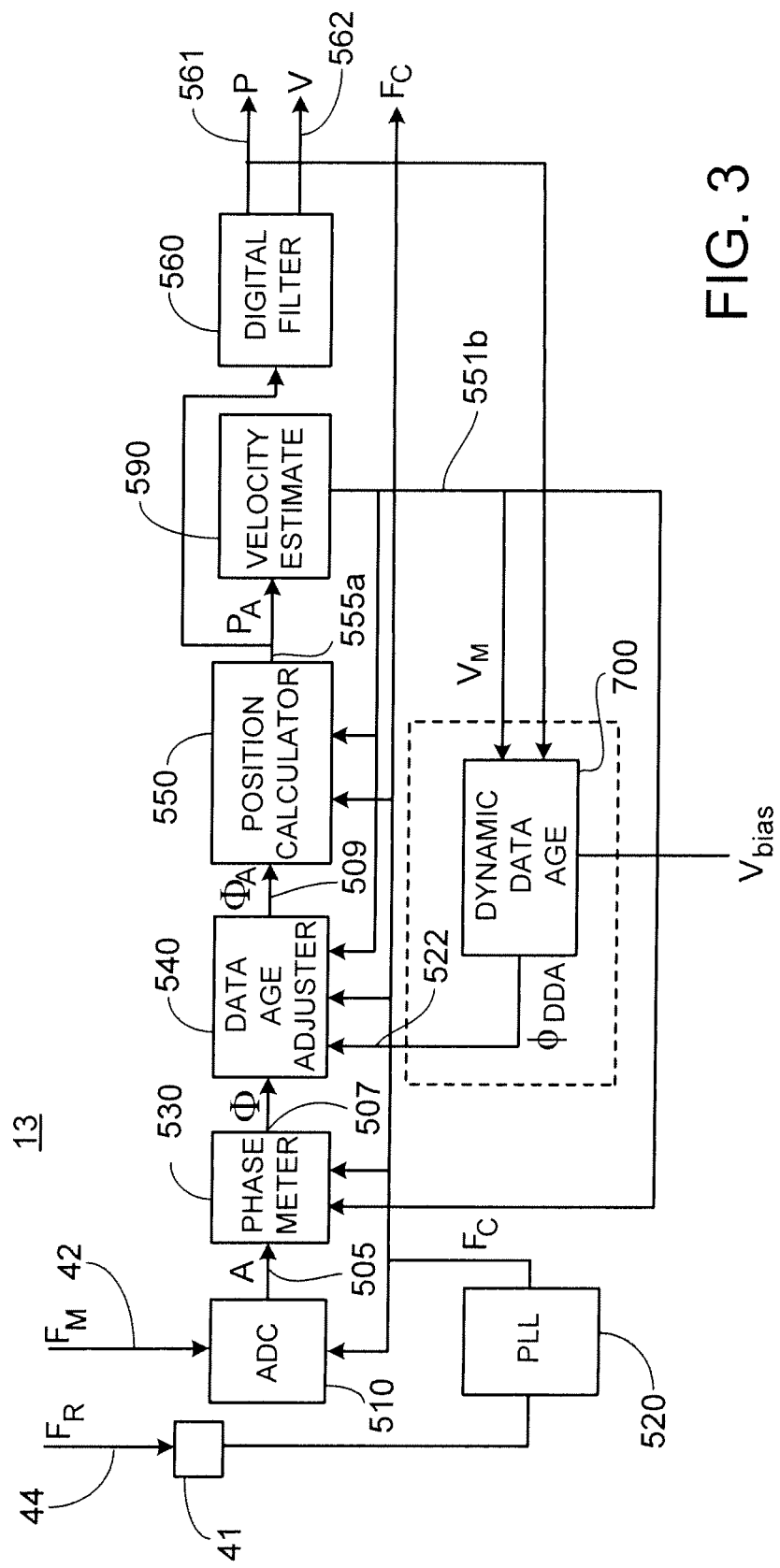
FIG. 3 is a block diagram of an embodiment of an electronic processing unit.

Referring to FIG. 3, digitizer 510 converts analog measurement signal 42 into a digitized signal, A, and applies this signal to circuit line 505. Phase meter 530 processes digitized signal A and calculates a digital measured phase signal, $\phi_{meas}$, which is subsequently adjusted by a data age adjuster 540 to produce a data age corrected phase, i.e., an adjusted phase signal, $\phi_A$. Position calculator 550 accumulates the phase and outputs an accumulated position, $P_A$. Digital filter 560 uses $P_A$ to output a filtered velocity value, V, and an adjusted and filtered position value, P.

In operation, a phase-locked loop 520 (PLL) generates a system clock signal $F_c$ for all digital electronics within the system. In typical embodiments, the system clock and ADC sampling rate of digitizer 510 is greater than twice the highest measurement signal frequency, i.e., the Nyquist rate. In typical embodiments, the system clock frequency is an integer multiple of the reference frequency. Digitizer 510 samples measurement signal 42 and outputs digital signal 505 representing the voltage of measurement signal 42. Digitizer 510 can also include an anti-aliasing filter and a buffer amplifier (not shown). Phase meter 530 converts digital signal 505 into a digital measured phase signal 507 by known methods, such as Discrete Fourier Transforms and Fast Fourier Transforms, and known devices, such as Hilbert Transform Phase Detectors and all-digital PLLs.

Figure 4:
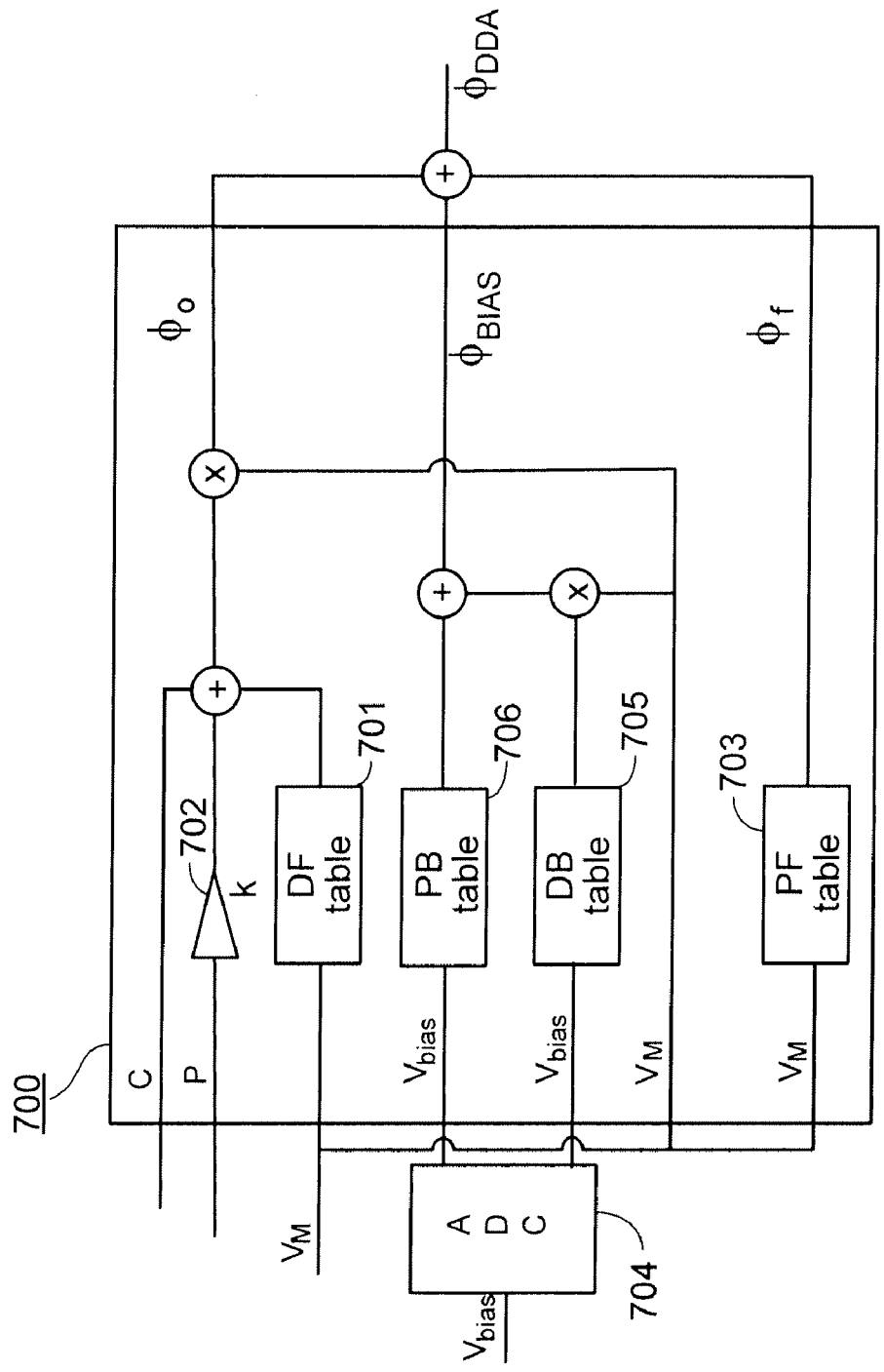
FIG. 4 is a block diagram of an embodiment of a dynamic data age unit.

Referring to FIG. 4, dynamic data age unit 700 receives data age adjusted position value, P, and data age adjusted velocity value, $V_M$, from digital filter or velocity estimator (not shown), and a constant data age value C from a central processing unit (CPU) (not shown) of heterodyne interferometer system. Based on the value $V_M$, a delay/frequency (DF) compensation value $DF[V_M]$ is obtained from DF look up table 701. Position value P is scaled by a factor of k by multiplier 702. For example, in some embodiments k is equal to 1 or $-1$. Dynamic data age unit 700 sums constant data age C, compensation value $DF[V_M]$ and the scaled position value, and multiplies the sum by $V_M$ to produce a phase adjustment value $\phi_o$. Dynamic data age unit 700 continually adjusts the value of $\phi_o$ as the values of both $V_M$ and P change, i.e., as retroreflector 32 moves, and thereby results in a dynamic adjustment of the data age by data age adjuster 700.

As shown in FIG. 4, dynamic data age unit 700 calculates two additional phase adjustment values $\phi_f$ and $\phi_{bias}$. Dynamic data age unit 700 receives measurement velocity value $V_M$ which is proportional to measurement signal frequency:

$$V_M \propto (F_M - F_R).\quad(2)$$

Based on the value $V_M$, a compensation value $PF[V_M]$ is obtained from phase/frequency (PF) look up table 703. Dynamic data age unit 700 calculates the phase adjustment value $\phi_f$ using $$\phi_f = PF[V_M].\quad(3)$$

This phase adjustment compensates for frequency dependent phase shifts introduced by, for example, design limitations in the post amp or low pass filter used in receiver 41. Dynamic data age unit 700 continually adjusts the value of $\phi_f$ as the value of $F_M$ changes. Note however, that the $\phi_f$ adjustment is equivalent to a velocity dependent data age adjustment of the type provided by DF look up table 701. Thus, In some embodiments, only one of these two compensations is performed.

Dynamic data age unit 700 receives APD bias voltage value $V_{bias}$ along with measurement velocity value $V_M$. The voltage bias value $V_{bias}$ is digitized using an analog to digital converter 704. In some embodiments, the digitized voltage bias is then passed on to a register (not shown). Based on $V_{bias}$, a delay/bias (DB) compensation value $DB[V_{bias}]$ is obtained from look up table 705, and a phase/bias (PB) compensation value $PB[V_{bias}]$ is obtained from look up table 706. PB look up table 706 provides the phase adjustment value corresponding to zero velocity. (where $F_M = F_R$). A phase adjustment value $\phi_{bias}$ is then calculated using the formula:

$$\phi_{bias} = V_M * DB[V_{bias}] + PB[V_{bias}]. \quad (4)$$

This phase adjustment compensates for bias dependent phase shifts and group delays introduced by changes in capacitance of APD 37. Dynamic data age unit 700 continually adjusts the value of $\phi_{bias}$ as the values of $V_{bias}$ and $V_M$ change.

Referring back to FIG. 3, the phase adjustment values $\phi_o$, $\phi_f$ and $\phi_{bias}$ are combined for a single dynamic data age value $\phi_{DDA}$, which is passed on to data age adjuster 540. Data age adjuster 540 operates to produce an adjusted phase value $$\phi_A = \phi_{meas} + \phi_o + \phi_f + \phi_{bias} \quad (5)$$

which has been compensated for measurement errors, including error resulting from the conditioning of interferometric measurement signal.

A number of embodiments of the invention have been described. Nevertheless, it will be understood that various modifications may be made without departing from the spirit and scope of the invention. For example, the data age adjuster may operate to produce separate course and fine adjustments to the measured phase. In this case, each phase adjustment value may be separated into a course adjustment value, or a fine adjustment value.

Additionally, in various embodiments, the processing functions may be rearranged, for example by combining two multiplies into a single multiply, or by change in the signs of values or addition/subtraction, as long as the intended result is obtained. For example, in some embodiments, the one-dimensional PB and DB look up tables are implemented as a single two-dimensional table. In other embodiments, one or more compensation values are obtained mathematically, for example by using a polynomial instead of a lookup table. In some embodiments, the compensation is accomplished by a combination of methods, for example a smaller one or two dimensional table, with interpolation between points.

Additional logic may be added to enable or disable each of the portions of the compensation for diagnostic or debug purposes.

In some embodiments, velocity or frequency or some other intermediate value may be used in the compensation calculations, with appropriate modifications. For example the PB table could contain phase compensation values $PB_0$ calculated for zero frequency, and the compensation equation would be:

$$\phi_{bias} = F_M * DB[V_{bias}] + PB_0[V_{bias}]. \quad (6)$$

In some embodiments, adjustments to, for example, the $\phi_{bias}$ equation, the look up table values, or the $V_{bias}$ value used as a table index, are performed to calibrate the design to accommodate differences in, for example, the characteristics of individual APDs used in each of multiple measurement axes.

One or more of the functions of the electronic processing unit may be implemented as software run on a digital computer.

In the example above, the APD and preamplifier circuit operated to condition the measurement by amplification signal based on a conditioning parameter $V_{bias}$. However, other types of conditioning based on other types of conditioning parameters may be used. For example, a standard variable gain amplifier may provide conditioning based on a gain parameter. Other types of conditioning my include, for example, filtering or frequency change.

The heterodyne displacement interferometer used in the above embodiment may, in other embodiments, be replaced by other types of interferometer systems. For example, the oprtical measurement signal may be produced by an interferometry system that may include any of single and/or multiple pass interferometers, passive interferometers, dynamic interferometers, and dispersion interferometers. Furthermore, in some embodiments, the interferometry system may monitor one or more degrees of freedom, each of which may produce a corresponding main interference signal, which may be compensated for measurement errors as disclosed herein. Furthermore, the degree(s) of freedom monitored by the interferometry system may include any of changes in distance to a measurement object, changes in relative distance between two measurement objects, changes in the angular orientation of a measurement object, and changes in the direction of the input beam.

Examples of dynamic interferometers are described in U.S. patent application Ser. No. 10/226,591 filed Aug. 23, 2002 and entitled "DYNAMIC INTERFEROMETER CONTROLLING DIRECTION OF INPUT BEAM" by Henry A. Hill. Examples of passive zero shear interferometers are described in U.S. patent application Ser. No. 10/207,314, entitled "PASSIVE ZERO SHEAR INTERFEROMETERS," filed Jul. 29, 2002, by Henry A. Hill. Examples of angular displacement interferometers are described in: U.S. patent application Ser. No. 10/226,591 entitled "DYNAMIC INTERFEROMETER CONTROLLING DIRECTION OF INPUT BEAM," filed Aug. 23, 2002; U.S. Provisional Application 60/314,345 filed Aug. 22, 2001 and entitled "PASSIVE ZERO SHEAR INTERFEROMETERS USING ANGLE SENSITIVE BEAM-SPLITTERS," both by Henry A. Hill, and U.S. patent application Ser. No. 10/271,034 entitled "INTERFEROMETERS FOR MEASURING CHANGES IN OPTICAL BEAM DIRECTION" and filed Oct. 15, 2002 by Henry A. Hill and Justin Kreuzer. Alternatively, or additionally, interferometry systems may include one or more differential angular displacement interferometers, examples of which are also described in U.S. patent application Ser. No. 10/271,034. Examples of interferometry systems for measuring more than one degree of freedom and for reducing beam shear are described in U.S. patent application Ser. No. 10/352,616 filed Jan. 28, 2003 and entitled "MULTIPLE-PASS INTERFEROMETRY" by Henry A. Hill and U.S. patent application Ser. No. 10/351,708 filed Jan. 27, 2003 and entitled "MULTI-AXIS INTERFEROMETER" by Henry A. Hill. Other forms of multiple pass interferometers are described in an article entitled "Differential interferometer arrangements for distance and angle measurements: Principles, advantages and applications" by C. Zanoni, VDI Berichte Nr. 749, 93-106 (1989). Examples of two-wavelength dispersion interferometers are described in U.S. Pat. No. 6,219,144 B1 entitled "APPARATUS AND METHOD FOR MEASURING THE REFRACTIVE INDEX AND OPTICAL PATH LENGTH EFFECTS OF AIR USING MULTIPLE-PASS INTERFEROMETRY" by Henry A. Hill, Peter de Groot, and Frank C. Demarest and U.S. Pat. No. 6,327,039 B1 by Peter de Groot, Henry A. Hill, and Frank C. Demarest.

Any numeric representation (analog, digital, binary, decimal, etc) or units (radians, cycles, etc.) may be used for the quantities being processed (i.e. time, voltage, phase, frequency, velocity, position).

Interferometry systems that incorporate any of the features described above may provide highly accurate measurements. Such systems can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules).

Overlay depends directly on the performance, i.e., accuracy and precision, of the distance measuring interferometers used to position the wafer and reticle (or mask) stages. Since a lithography tool may produce $50-100 M/year of product, the economic value from improved performance distance measuring interferometers is substantial. Each 1% increase in yield of the lithography tool results in approximately $1 M/year economic benefit to the integrated circuit manufacturer and substantial competitive advantage to the lithography tool vendor. The function of a lithography tool is to direct spatially patterned radiation onto a photoresist-coated wafer. The process involves determining which location of the wafer is to receive the radiation (alignment) and applying the radiation to the photoresist at that location (exposure). To properly position the wafer, the wafer includes alignment marks that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photochemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as conditioning parameter dependent measurement errors (e.g., bias voltage dependant group delay introduced by the use of an APD to amplify a measurement signal) minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which are incorporated herein by reference.

Interferometry systems incorporating the features described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages.

Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 5:
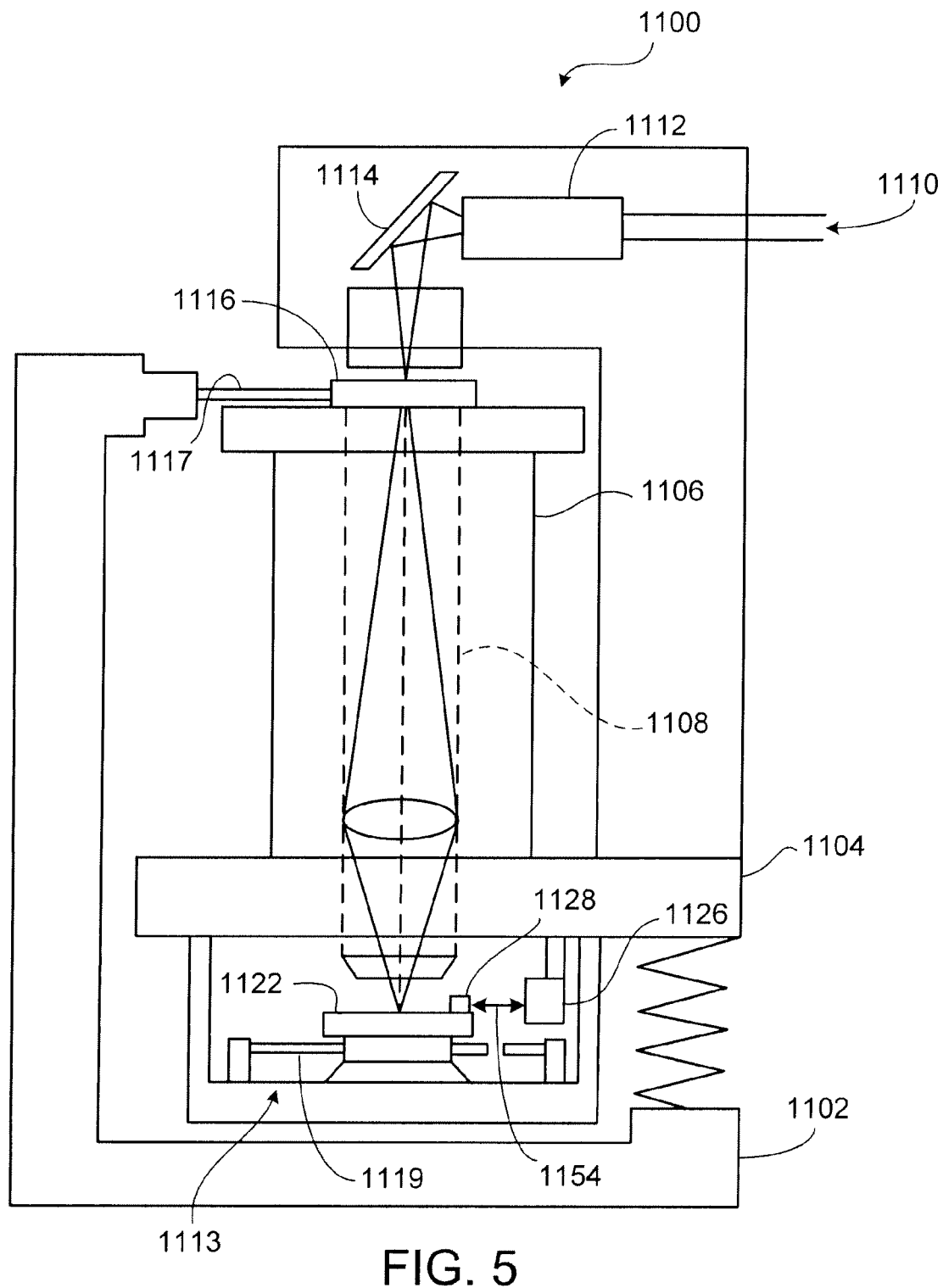
FIG. 5 is a schematic diagram of a lithography system that includes an interferometry system as described herein and is used to make integrated circuits.

An example of a lithography scanner 1100 using an interferometry system 1126 is shown in FIG. 5. The interferometry system incorporating the features described above is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems which incorporate the features described above can also be used to precisely measure the position of the mask stage as well as other moveable elements whose position must be accurately monitored in processes for fabricating lithographic structures (see supra Sheats and Smith, *Microlithography: Science and Technology*).

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 6:
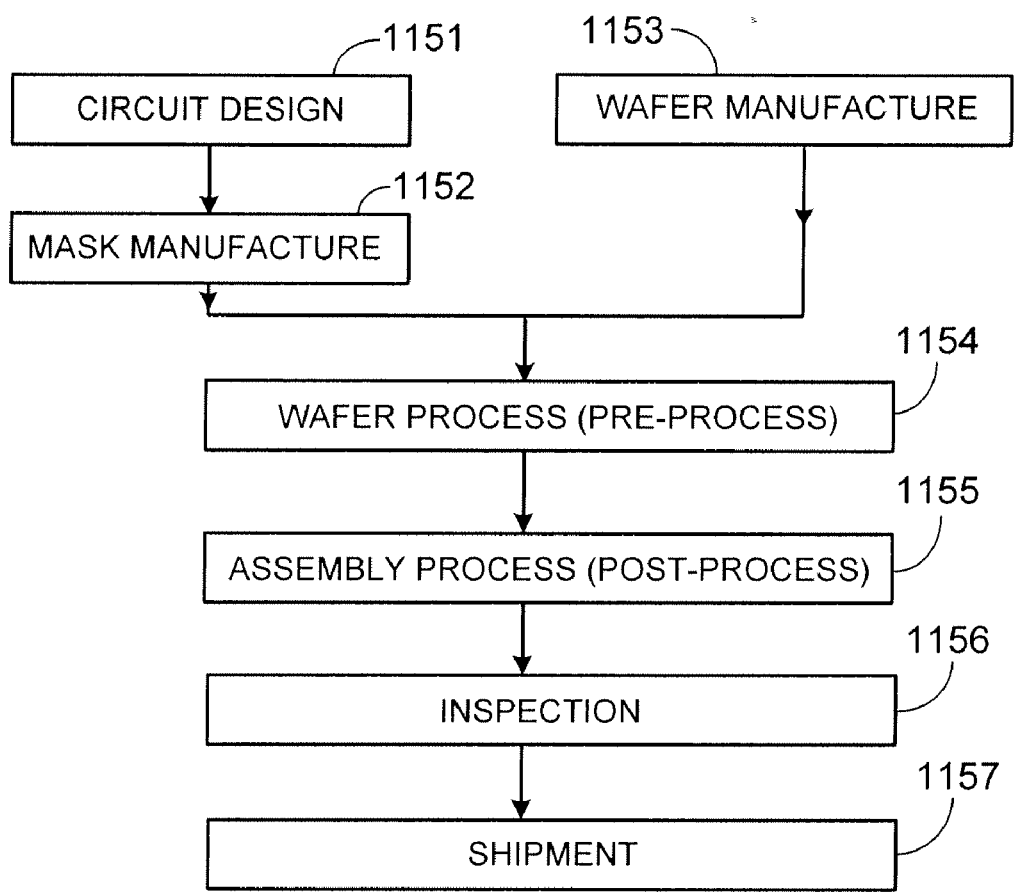
FIG. 6 is a flow chart that shows steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 6 and 7. FIG. 6 is a flow chart of the sequence of manufacturing a semiconductor device such as a semiconductor chip (e.g., IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution to those patterns on the mask, interferometric positioning of the lithography tool relative to the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 7:
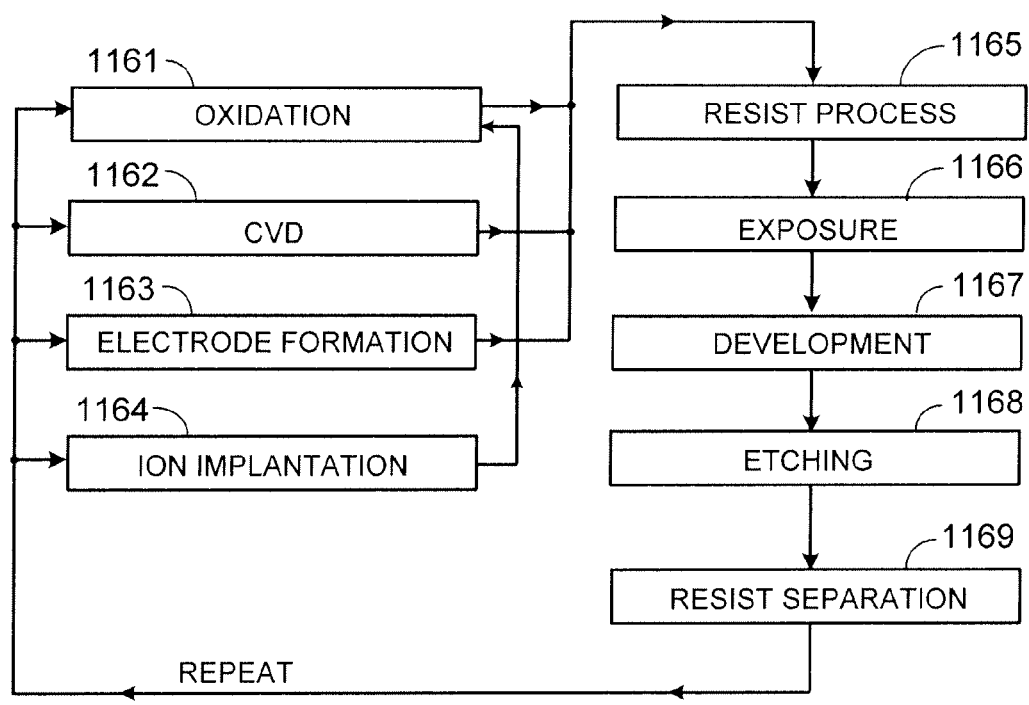
FIG. 7 is a flow chart that shows further steps for making integrated circuits.

FIG. 7 is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps. Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 8:
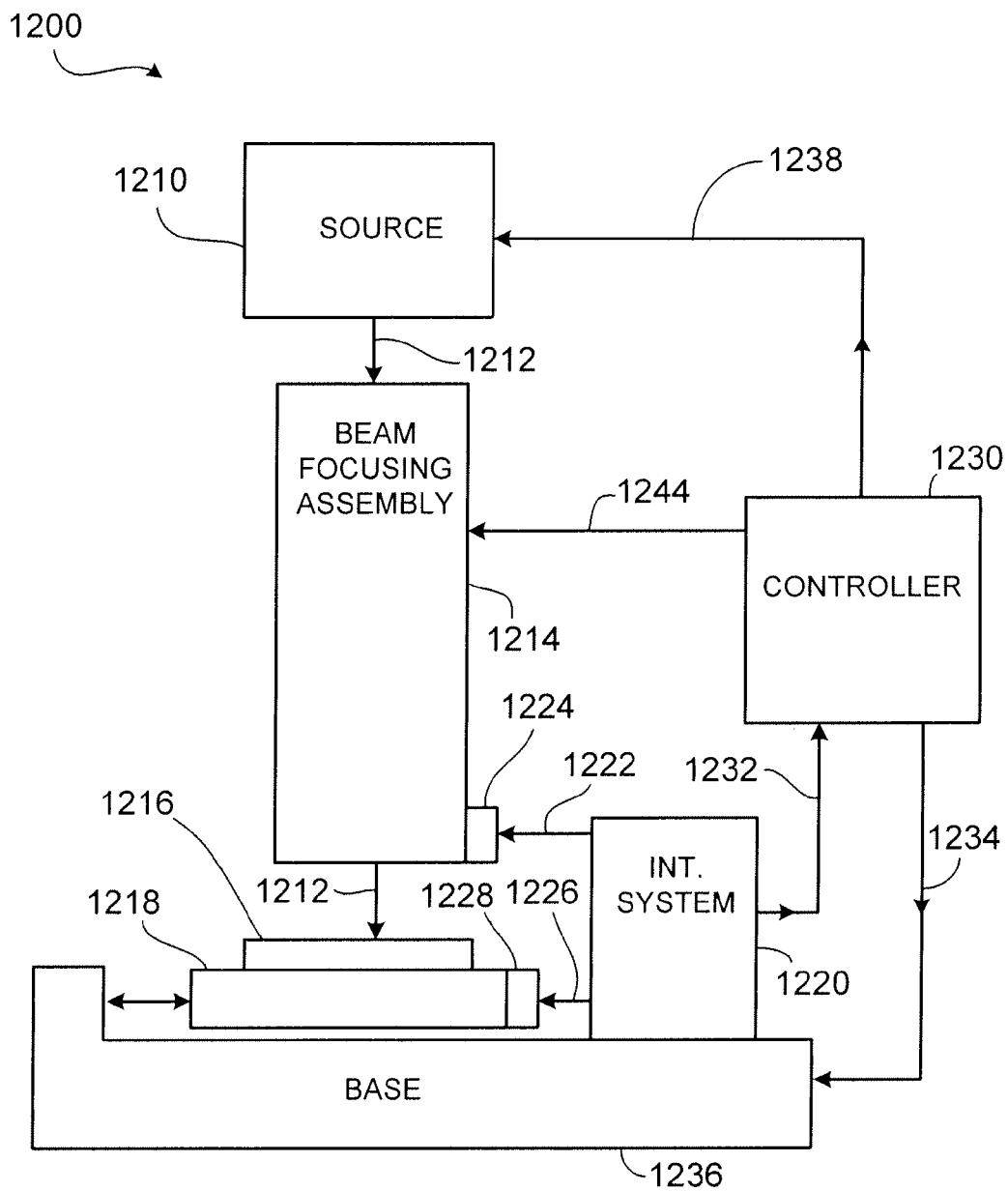
FIG. 8 is a schematic diagram of a beam writing system that includes an interferometry system as described herein.

As an example, a schematic of a beam writing system 1200 is shown in FIG. 8. A source 1210 generates a write beam 1212, and a beam focusing assembly 1214 directs the radiation beam to a substrate 1216 supported by a movable stage 1218. To determine the relative position of the stage, an interferometry system 1220 incorporating the features described above directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrupole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
    conditioning a measurement signal from an interferometer, said conditioning characterized by one or more conditioning parameters;
    measuring a plurality of values for the conditioned measurement signal;
    providing one or more values indicative of the conditioning parameters;
    determining an adjustment value at each measured value of the conditioned measurement signal based on the one or more of the measured values indicative of the conditioning parameters; and
    adjusting a measured value of the measurement signal according to the adjustment value.

2. The method of claim 1, wherein the adjustment value is determined so as to compensate for a measurement error resulting from the conditioning.

3. The method of clam 2, wherein the measurement error comprises data age.

4. The method of claim 2, wherein the measurement error comprises group delay.

5. The method of claim 2, wherein the measurement error comprises a phase shift.

6. The method of claim 2, wherein the measurement error comprises detector delay.

7. The method of claim 2, wherein the conditioning of the measurement signal comprises a variable amplification of the signal, wherein the amplification depends on the conditioning parameter.

8. The method of claim 7, wherein the variable amplification is provided by an avalanche photodiode.

9. The method of claim 7, wherein the measurement error comprises error introduced by the amplification.

10. The method of claim 1, wherein the adjustment value is determined from one or more look up tables.

11. The method of claim 1, wherein the adjustment value is determined from one or more mathematical formulae.

12. The method of claim 1, wherein the adjustment value is determined from one or more mathematical formulae and one or more look up tables.

13. An apparatus comprising:
    a receiver unit configured to detect an optical measurement signal from an interferometer, convert the optical measurement signal into an electrical measurement signal, and condition the electrical measurement signal based on one or more conditioning parameters; and
    an electronic processing unit coupled to the receiver unit, the electronic processing unit configured to: (i) measure a plurality of values for the conditioned signal, (ii) receive one or more values indicative of the conditioning parameters; (iii) determine an adjustment value at each measured value of the conditioned signal based on the one or more of the measured values indicative of the conditioning parameters; and (iv) adjust a measured value of the measurement signal according to the adjustment value.

14. The apparatus of claim 13, wherein the electronic processing unit comprises a data age adjuster.

15. The apparatus of claim 14, wherein the electronic processing unit comprises a dynamic data age unit.

16. The apparatus of claim 13, wherein the adjustment value is determined so as to compensate for a measurement error resulting from the conditioning.

17. The apparatus of claim 16, wherein the receiver unit comprises an avalanche photodiode.

18. The apparatus of claim 17, wherein the conditioning parameters comprise a bias voltage applied to the avalanche photodiode.

19. The apparatus of claim 18, wherein one or more electrical characteristics of the avalanche photo diode depend on the bias voltage.

20. The apparatus of claim 19, wherein the capacitance of the avalanche photodiode depends on the bias voltage.

21. The apparatus of claim 18, wherein bias dependent changes in the electrical characteristics of the avalanche photodiode introduce a bias dependent measurement error.

22. The apparatus of claim 17, wherein the receiver unit further comprises an amplification circuit.

23. The apparatus of claim 22, wherein one or more electrical characteristics of the amplification circuit depend on the bias voltage.

24. The apparatus of claim 23, wherein bias dependent changes in the electrical characteristics of the amplification circuit introduce a bias dependent measurement error.

25. An interferometer system comprising
    an interferometer configured to produce one or more optical measurement signals, wherein each measurement signal corresponds to a difference in the optical path lengths of a reference beam and a measurement beam; and
    the apparatus of claim 13.

26. The apparatus of claim 25, wherein the interferometer is of the heterodyne type.

27. The apparatus of claim 25, wherein the measurement signals characterize the position of one or more measurement objects.

28. The apparatus of claim 25, wherein the measurement signals characterize an optical property of one or more measurement objects.

29. The apparatus of claim 25, wherein the measurement signals characterize one or more angular displacements.

30. The apparatus of claim 28, wherein the optical properties comprise dispersion.

31. A lithography system for use in fabricating integrated circuits on a wafer, the system comprising:
    a stage for supporting the wafer;
    an illumination system for imaging spatially patterned radiation onto the wafer;
    a positioning system for adjusting the position of the stage relative to the imaged radiation; and
    the apparatus of claim 27 wherein the interferometer is configured to monitor the position of the wafer relative to the imaged radiation.

32. A lithography system for use in fabricating integrated circuits on a wafer, the system comprising:
- a stage for supporting the wafer; and
- an illumination system including a radiation source, a mask, a positioning system, a lens assembly, and the apparatus of claim 27,
- wherein during operation the source directs radiation through the mask to produce spatially patterned radiation, the positioning system adjusts the position of the mask relative to the radiation from the source, the lens assembly images the spatially patterned radiation onto the wafer, and the interferometer monitors the position of the mask relative to the radiation from the source.

33. A beam writing system for use in fabricating a lithography mask, the system comprising:
- a source providing a write beam to pattern a substrate;
- a stage supporting the substrate;
- a beam directing assembly for delivering the write beam to the substrate;
- a positioning system for positioning the stage and beam directing assembly relative to one another; and
- the apparatus of claim 27 wherein the interferometer system is configured to monitor the position of the stage relative to the beam directing assembly.

34. A lithography method for use in fabricating integrated circuits on a wafer, the method comprising:
- supporting the wafer on a movable stage;
- imaging spatially patterned radiation onto the wafer;
- adjusting the position of the stage; and
- monitoring the position of the stage using the apparatus of claim 27.

35. A lithography method for use in the fabrication of integrated circuits comprising:
- directing input radiation through a mask to produce spatially patterned radiation;
- positioning the mask relative to the input radiation;
- monitoring the position of the mask relative to the input radiation using the apparatus of claim 27; and
- imaging the spatially patterned radiation onto a wafer.

36. A lithography method for fabricating integrated circuits on a wafer, comprising:
- positioning a first component of a lithography system relative to a second component of a lithography system to expose the wafer to spatially patterned radiation; and
- monitoring the position of the first component relative to the second component using the apparatus of claim 27.

37. A method for fabricating integrated circuits, the method comprising the lithography method of claim 34.

38. A method for fabricating integrated circuits, the method comprising the lithography method of claim 35.

39. A method for fabricating integrated circuits, the method comprising the lithography method of claim 36.

40. A method for fabricating integrated circuits, the method comprising using the lithography system of claim 31.

41. A method for fabricating integrated circuits, the method comprising using the lithography system of claim 32.

42. A method for fabricating a lithography mask, the method comprising:
- directing a write beam to a substrate to pattern the substrate;
- positioning the substrate relative to the write beam; and
- monitoring the position of the substrate relative to the write beam using the system of claim 27.

* * * * *